United States Patent
Yin et al.

(10) Patent No.: US 12,408,164 B2
(45) Date of Patent: Sep. 2, 2025

(54) INTRA-USER EQUIPMENT MULTIPLEXING METHOD, USER EQUIPMENT, AND RADIO NODE FOR ENABLING THE METHOD

(71) Applicant: JRD COMMUNICATION (SHENZHEN) LTD., Shenzhen (CN)

(72) Inventors: Xiaoxue Yin, Shenzhen (CN); Jia Sheng, Shenzhen (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 472 days.

(21) Appl. No.: 18/004,861

(22) PCT Filed: Jul. 10, 2020

(86) PCT No.: PCT/CN2020/101413
§ 371 (c)(1),
(2) Date: Jan. 9, 2023

(87) PCT Pub. No.: WO2022/006878
PCT Pub. Date: Jan. 13, 2022

(65) Prior Publication Data
US 2023/0354313 A1 Nov. 2, 2023

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 1/1854* (2013.01);
(Continued)

(58) Field of Classification Search
CPC ......... H04W 72/0453; H04W 72/0446; H04W 84/12; H04W 72/0457; H04W 88/06;
(Continued)

(56) References Cited

U.S. PATENT DOCUMENTS

2017/0332386 A1 11/2017 Li
2018/0176937 A1 6/2018 Chen
(Continued)

FOREIGN PATENT DOCUMENTS

CN 109891987 A 6/2019
CN 109964527 A 7/2019
(Continued)

OTHER PUBLICATIONS

International Search Report in International application No. PCT/CN2020/101413, mailed on Mar. 24, 2021.
(Continued)

*Primary Examiner* — Vinncelas Louis
(74) *Attorney, Agent, or Firm* — PV IP PC; Wei Te Chung

(57) ABSTRACT

An intra-user equipment (UE) multiplexing method is executed in a UE. The UE obtains respective timeline conditions for multiplexing uplink transmission with high priority and uplink transmission with low priority when detecting collision in time between the uplink transmissions with different priorities. The UE performs multiplexing of the uplink transmissions with different priorities when the respective timeline conditions are satisfied.

20 Claims, 5 Drawing Sheets

(51) Int. Cl.
*H04L 1/1829* (2023.01)
*H04W 72/0446* (2023.01)
*H04W 72/21* (2023.01)
*H04W 72/232* (2023.01)
*H04W 72/566* (2023.01)
*H04B 7/06* (2006.01)

(52) U.S. Cl.
CPC ....... *H04L 1/1861* (2013.01); *H04W 72/0446* (2013.01); *H04W 72/21* (2023.01); *H04W 72/232* (2023.01); *H04W 72/566* (2023.01); *H04B 7/0626* (2013.01)

(58) Field of Classification Search
CPC ... H04L 1/1642; H04L 5/0044; H04L 5/0007; H04L 5/0064; H04L 27/2602; H04L 5/0094; H04L 5/0058; H04B 7/0626
See application file for complete search history.

(56) References Cited

U.S. PATENT DOCUMENTS

| | | | |
|---|---|---|---|
| 2018/0278380 A1 | 9/2018 | Kim | |
| 2019/0052414 A1 | 2/2019 | Babaei | |
| 2021/0250134 A1* | 8/2021 | Islam | H04B 7/0626 |
| 2021/0321394 A1* | 10/2021 | Li | H04W 72/0446 |

FOREIGN PATENT DOCUMENTS

| | | |
|---|---|---|
| CN | 110474747 A | 11/2019 |
| CN | 111278143 A | 6/2020 |
| CN | 111314033 A | 6/2020 |
| WO | 2019214468 A1 | 11/2019 |
| WO | 2020134382 A1 | 7/2020 |

OTHER PUBLICATIONS

Written Opinion of the International Search Authority in International application No. PCT/CN2020/101413, mailed on Mar. 24, 2021.
Chinese Office Action issued in corresponding Chinese Patent Application No. 202080103047.4 dated Mar. 3, 2025, pp. 1-9.
NPL1: Ericsson: "Scheduling/HARQ/CSI Processing Timeline Enhancements for NR URLLC", 3GPP Draft; R1-1812156,[retrieved on Nov. 3, 2018].
NPL2: Huawei et al.: "Discussion on intra-UE prioritization/multiplexing", 3GPP Draft; R2-1815450, [retrieved on Sep. 28, 2019].
NPL3: Huawei et al.: "UCI enhancements for URLLC", 3GPP DRAFT;R1-1911891, [retrieved on Nov. 9, 2019].
European Search Report in European application No. 20944266.4, mailed on Mar. 14, 2024.

* cited by examiner

Cancellation point

INTRA-USER EQUIPMENT MULTIPLEXING METHOD, USER EQUIPMENT, AND RADIO NODE FOR ENABLING THE METHOD

CROSS REFERENCE TO RELATED APPLICATIONS

The disclosure is a US national phase application based upon an International Application No. PCT/CN2020/101413, filed on Jul. 10, 2020, titled "INTRA-USER EQUIPMENT MULTIPLEXING METHOD, USER EQUIPMENT, AND RADIO NODE FOR ENABLING THE METHOD", which is incorporated by reference in the present application in its entirety.

BACKGROUND OF DISCLOSURE

1. Field of Disclosure

The present disclosure relates to the field of communication systems, and more particularly, to intra-user equipment uplink traffic multiplexing.

2. Description of Related Art

Wireless communication systems and networks have developed towards being a broadband and mobile system. In cellular wireless communication systems, user equipment (UE) is connected by a wireless link to a radio access network (RAN). The RAN comprises a set of base stations (BSs) which provide wireless links to the UEs located in cells covered by the base station, and an interface to a core network (CN) which provides overall network control. As will be appreciated the RAN and CN each conduct respective functions in relation to the overall network. The 3rd Generation Partnership Project (3GPP) has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Ultra-reliable low-latency communication (URLLC), is one of several different types of use cases supported by the 5G NR standard, as stipulated by 3GPP Release 15. URLLC is a communication service for successfully delivering packets with stringent requirements, particularly in terms of availability, latency, and reliability. URLLC is developed to support the emerging applications and services, such as wireless control and automation in industrial factory environments, inter-vehicular communications for improved safety and efficiency, and the tactile internet. Thus, URLLC is important for 5G as it supports verticals bringing new business to the whole telecommunication industry.

One of the key features of URLLC is low latency which is the key point to make autonomous vehicle and remote surgeries possible. Low latency allows a network to be optimized for processing incredibly large amounts of data with minimal delay or latency. URLLC requires a quality of service (QoS) totally different from mobile broadband services.

URLLC guarantees latency to be 1 ms or less. Time-sensitive networking (TSN) is another component of the 5G URLLC. All devices along a URLLC connection have to synchronize on the same time-base. Enabling technologies for URLLC, for example, include: integrated frame structure, incredibly fast turnaround, efficient control and data resource sharing, grant-free based uplink transmission, and advanced channel coding schemes.

Technical Problem

Intra-UE multiplexing and prioritization of traffic with different priority is required for 5G NR communication. The scenario of co-existence of channels with different priorities is very essential for industrial internet of things (IIoT)/URLLC use cases. Uplink (UL) traffic of high priority channel is prioritized over low priority channel. However, always dropping low priority UL transmission is not good from system performance perspective. Hence, new enhancement to current multiplexing mechanism for different priorities UL transmission is desired.

SUMMARY

An object of the present disclosure is to propose an intra-user equipment (UE) multiplexing method, radio node, and user equipment.

A first aspect of the disclosure provides an intra-user equipment (UE) multiplexing method executable in a UE. The method comprises:
identifying a group of overlapping uplink transmissions in a time resource unit, wherein the group of overlapping uplink transmissions comprises a first high priority uplink transmission of a high priority service type and a first low priority uplink transmission of a low priority service type;
obtaining a first multiplexing timeline condition for the high priority service type and a second multiplexing timeline condition for the low priority service type; and
performing multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition.

A second aspect of the disclosure provides an intra-user equipment (UE) multiplexing method executable in a radio node device. The method comprises:
transmitting a control signal to enable a multiplexing mode for multiplexing of a group of overlapping uplink transmissions in a time resource unit at a UE;
allowing the UE in the multiplexing mode to obtain a first multiplexing timeline condition for a high priority service type and a second multiplexing timeline condition for a low priority service type when the group of overlapping uplink transmissions comprises a first high priority uplink transmission of the high priority service type and a first low priority uplink transmission of the low priority service type; and
allowing the UE in the multiplexing mode to perform multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition.

A third aspect of the disclosure provides a user equipment comprising a transceiver and a processor connected with the transceiver. The processor is configured to execute the following steps comprising:

identifying a group of overlapping uplink transmissions in a time resource unit, wherein the group of overlapping uplink transmissions comprises a first high priority uplink transmission of a high priority service type and a first low priority uplink transmission of a low priority service type;

obtaining a first multiplexing timeline condition for the high priority service type and a second multiplexing timeline condition for the low priority service type; and performing multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition.

A fourth aspect of the disclosure provides a radio node device comprising a transceiver and a processor connected with the transceiver. The processor is configured to execute the following steps comprising:

transmitting a control signal to enable a multiplexing mode for multiplexing of a group of overlapping uplink transmissions in a time resource unit at a UE;

allowing the UE in the multiplexing mode to obtain a first multiplexing timeline condition for a high priority service type and a second multiplexing timeline condition for a low priority service type when the group of overlapping uplink transmissions comprises a first high priority uplink transmission of the high priority service type and a first low priority uplink transmission of the low priority service type; and allowing the UE in the multiplexing mode to perform multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as computer program product, that causes a computer to execute the disclosed method.

The disclosed method may be programmed as computer program, that causes a computer to execute the disclosed method.

Advantageous Effects

The disclosed method of UL multiplexing addresses the problem of collision between UL transmissions with different priorities. It is evident that always dropping/skipping the low priority channel would highly impact the system overall latency and unnecessarily inefficient. Regarding the multiplexing, the legacy mechanism is not applicable for the UL transmission with different traffics. The disclosure provides several embodiments to accommodate different scenarios. Considering the compatibility to previous releases, we provide alternative designs to enabling the multiplexing for UL transmissions with different priorities. To achieve better performance, new timeline conditions, UCI bit sequence generation and collision handling procedures are introduced for multiplexing for UL transmissions with different priorities.

It is desired to judge multiplexing among hybrid automatic repeat request (HARQ) acknowledgement (HARQ-ACK), scheduling requests (SR), channel state information (CSI) and physical uplink shared channel (PUSCH) for traffic with different priorities, including uplink control information (UCI) on physical uplink control channel (PUCCH) and UCI on PUSCH. Since the URLLC traffic has more stringent requirements on latency and reliability, how to multiplexing different services is still a question. For example, dropping eMBB transmissions leads to retransmissions of eMBB traffic. For HARQ feedback, dropping HARQ-ACK may lead to retransmission of PDSCHs with large transport block sizes (TBSs). An aspect of the disclosure provides a multiplexing method for different services with different priorities to improve the performance of eMBB.

The disclosed method provides alternative designs for multiplexing mechanism, including forward compatible multiplexing, time domain resource allocating to improve URLLC latency, generating UCI bit sequence for UCIs with different priorities, and collision handling for different priority traffics. Additionally, the disclosed method provides different specific designs to provide flexibility and to accommodate different scenarios.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

URLLC and time sensitive communication (TSC) are examples of high priority service types. Enhanced mobile broadband (eMBB), machine type communication (MTC), and massive MTC are examples of low priority service types. Embodiments of the disclosed method facilitate intra-UE multiplexing of UL transmissions with different priorities.

Figure 1:
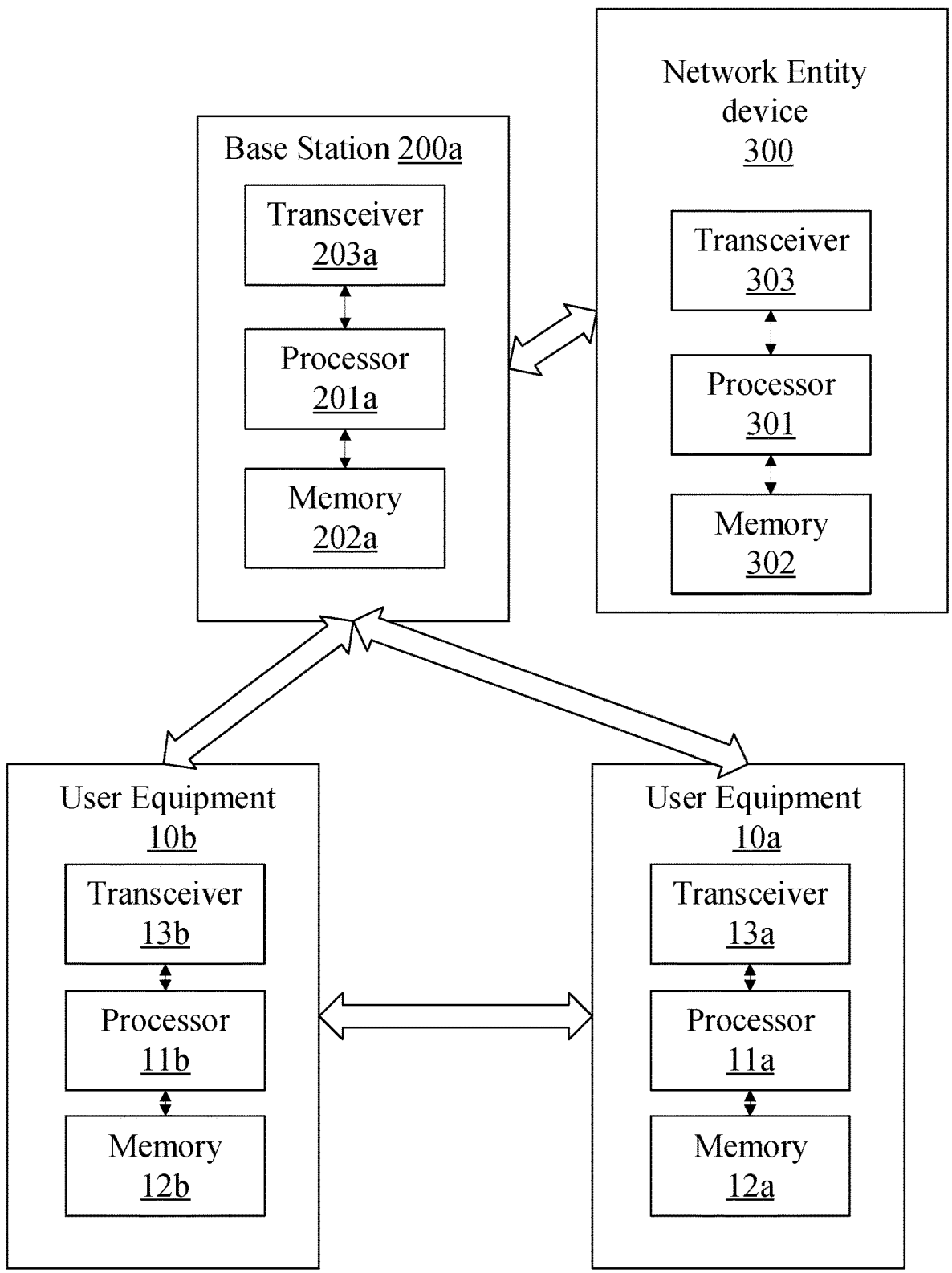
FIG. 1 is a schematic diagram showing a system according to an embodiment of the present disclosure.

With reference to FIG. 1, a telecommunication system including a UE 10a, a UE 10b, a base station (BS) 200a, and a network entity device 300 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGS. The UE 10a may include a processor 11a, a memory 12a, and a transceiver 13a. The UE 10b may include a processor 11b, a memory 12b, and a transceiver 13b. The base station 200a may include a processor 201a, a memory 202a, and a transceiver 203a. The network entity device 300 may include a processor 301, a memory 302, and a transceiver 303. Each of the processors 11a, 11b, 201a, and 301 may be configured to implement proposed functions, procedures and/or methods described in the description. Layers of radio interface protocol may be implemented in the processors 11a, 11b, 201a, and 301. Each of the memory 12a, 12b, 202a, and 302 operatively stores a variety of program and information to operate a connected processor. Each of the transceiver 13a, 13b, 203a, and 303 is operatively coupled with a connected processor, transmits and/or receives radio signals or wireline signals. The UE 10a may be in communication with the UE 10b through a sidelink. The base station 200a may be an eNB, a gNB, or one of other types of radio nodes, and may configure radio resources for the UE 10a and UE 10b.

Each of the processor 11a, 11b, 201a, and 301 may include an application-specific integrated circuits (ASICs), other chipsets, logic circuits and/or data processing devices. Each of the memory 12a, 12b, 202a, and 302 may include a read-only memory (ROM), a random access memory (RAM), a flash memory, a memory card, a storage medium and/or other storage devices. Each of the transceiver 13a, 13b, 203a, and 303 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 300 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2:
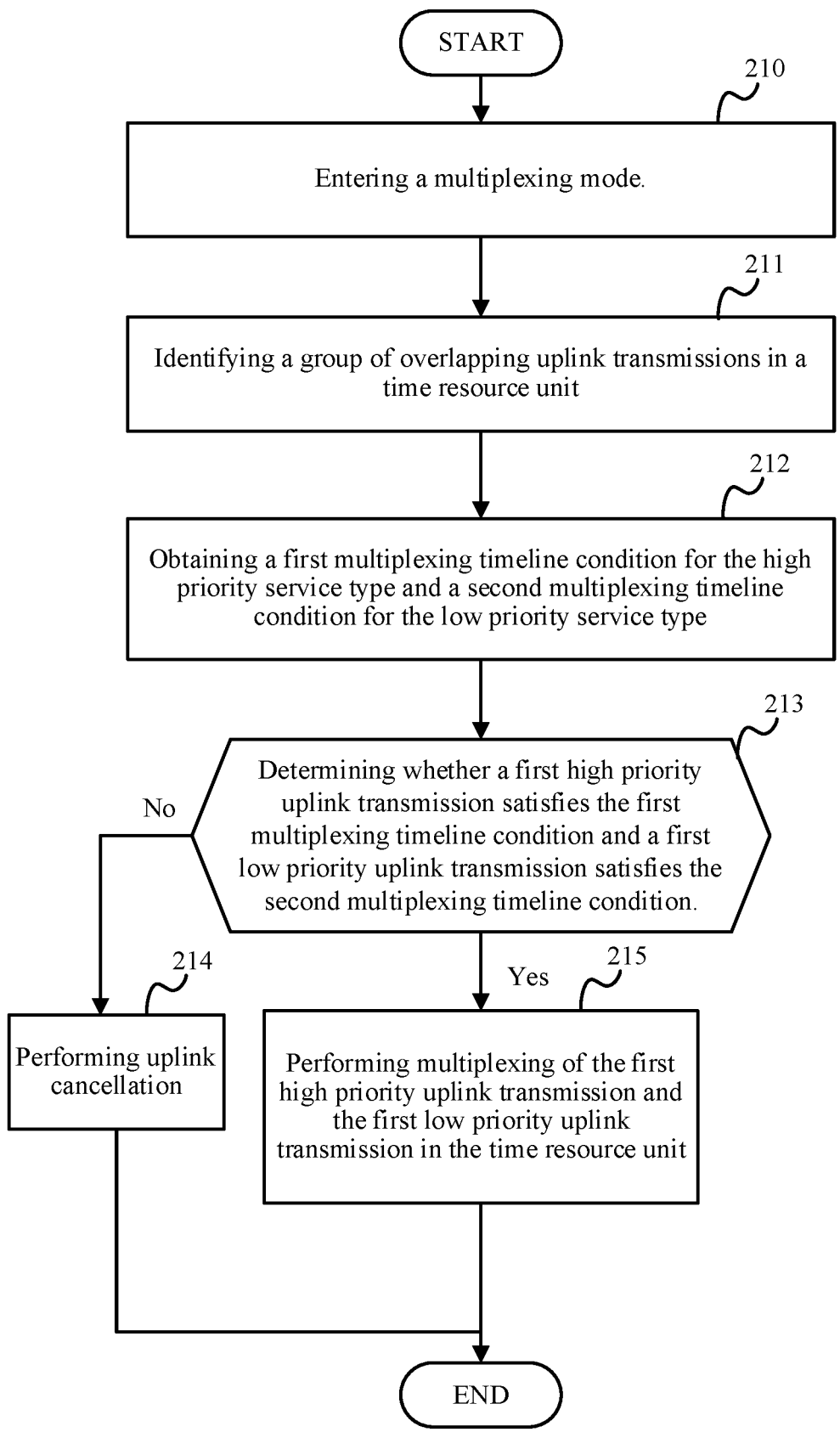
FIG. 2 illustrates a disclosed method according to an embodiment of the present disclosure.

With reference to FIG. 2, a UE, such as the UE 10a or 10b in FIG. 1, is performing an intra-UE multiplexing method. The UE enters a multiplexing mode to perform the intra-UE multiplexing method (block 210). The UE may actively enable the multiplexing mode or passively enter the multiplexing mode in response to a control signaling from a network entity, such as the BS 200a or the network entity device 300.

An embodiment of the disclosed method for enabling intra-UE multiplexing with different priorities is detailed in the following.

To be compatible with previous releases of 3GPP standards, multiplexing for uplink (UL) transmissions with different priorities may be optionally configured by a base station, such as the BS 200a, or triggered by some conditions, and Release 16 of 3GPP standards may be utilized as a baseline. The disclosed method may be applied to multiplex HARQ-ACK/SR/CSI and PUSCH for traffic with different priorities. In the description, HARQ-ACK represents HARQ feedback which may include acknowledgment (ACK) and negative-acknowledgment (NACK).

An embodiment of the disclosed method for on-command enabling of intra-UE multiplexing is detailed in the following.

Enabling multiplexing procedure for different priorities may be configured by downlink control information (DCI) or a higher layer signal, such as a radio resource control (RRC) signal. For example, a base station may send a parameter IntraUEVIUXDiffPrio to the UE to indicate enabling of the multiplexing mode. The UE multiplexes UL transmissions with different priorities in response to the parameter InfraUEVIUXDiffPrio which is configured by DCI or higher layer signaling. For example, the IntraUEVIUXDiffPrio asserted means that the multiplexing mode is enabled to support multiplexing procedure for different priorities. On the other hand, the InfraUEVUXDiffPrio de-asserted means that the multiplexing mode is disabled, and the multiplexing procedure for different priorities is not supported.

An embodiment of the disclosed method for event-triggered enabling of intra-UE multiplexing by is detailed in the following.

Uplink transmission multiplexing with different priorities may also be enabled by some conditions. Regarding the current mechanism in NR Release 16, only traffic prioritization and cancellation is performed for UL transmission collision between different traffic priorities. Accordingly, eMBB service type is a traffic type with lower priority than URLLC and is to be dropped in UL transmission collision with URLLC and leads to bad system performance. Hence, the UE may use a counter to count dropping times of eMBB transmissions. When the counter is greater than the pre-configured threshold, UE may send a request to the base station for enabling the multiplexing mode for UL transmissions with different priorities. The request may be carried by PUCCH or PUSCH. The base station receives the request and enable the multiplexing mode in response to the request.

Thus, the UE may enable the multiplexing mode in response to a condition that the counter counting a number of times of dropping low priority uplink transmissions has reached a predetermined number. Alternatively, the UE may enable the multiplexing mode in response to a condition that dropping of low priority uplink transmissions contributes to a predetermined ratio of all low priority uplink transmissions during a period of time.

Frequently dropping eMBB transmission may lead to frequent retransmission of eMBB. The base station may determine whether to enable multiplexing procedure for UL transmission with different priorities based on retransmission times of eMBB, eMBB transport block (TB) size, channel quality, and others. The enabling command may be the same as illustrated in the paragraph associated with the parameter IntraUEVIUXDiffPrio. The base station may enable the multiplexing mode when detecting a number of eMBB retransmissions exceeds a predetermined number of times. The base station may enable the multiplexing mode for eMBB traffic with TB size greater than a predetermined TB size. The base station may enable the multiplexing mode in response to a channel quality condition lower than a predetermined channel quality level.

Embodiments of the disclosed method providing Timeline condition enhancements are detailed in the following.

In Release 16, multiplexing procedure is only performed between same priority UL transmissions. The UE multiplexes all UCI types if the timeline conditions are met. A UE expects that the first symbol $S_c$, of the earliest PUCCH or PUSCH among a group overlapping PUCCHs and PUSCHs in one slot, satisfies the following timeline conditions. Take PDSCH as an example, $S_0$ is not before a symbol with cyclic prefix (CP) starting after processing time $T_{proc,1}^{mux}$ after a last symbol of any corresponding PDSCH associated with the earliest PUCCH or PUSCH. The processing time $T_{proc,1}^{mux}$ is given by maximum of $\{T_{proc,1}^{mux,1}, \ldots, T_{proc,1}^{mux,i}, \ldots\}$ where for the i-th PDSCH with corresponding HARQ-ACK transmission on a PUCCH which is the group of overlapping PUCCHs and PUSCHs, $T_{proc,1}^{mux,i}=N_1+d_{1,1}+1)\cdot(2048+144)\cdot\kappa\cdot 2^{-\mu}\cdot T_c$, $d_{1,1}$ is selected for the i-th PDSCH following 3GPP technical specification (TS) 38.214 clause 5.3. $N_1$ is selected based on the UE PDSCH processing capability of the i-th PDSCH and SCS configuration $\mu$. The $\mu$ corresponds to the smallest SCS configuration among the SCS configurations used for all involved uplink and downlink transmissions including the i-th PDSCH, the PDCCH scheduling the i-th PDSCH if any, the PUCCH with corresponding HARQ-ACK transmission for i-th PDSCH, and all PUSCHs in the group of overlapping PUCCHs and PUSCHs. $N_1$ and $d_{1,1}$ are defined in section 6 of TS 38.214, and $\kappa$ and $T_c$ are defined in section 4 of TS 38.211.

Figure 3:
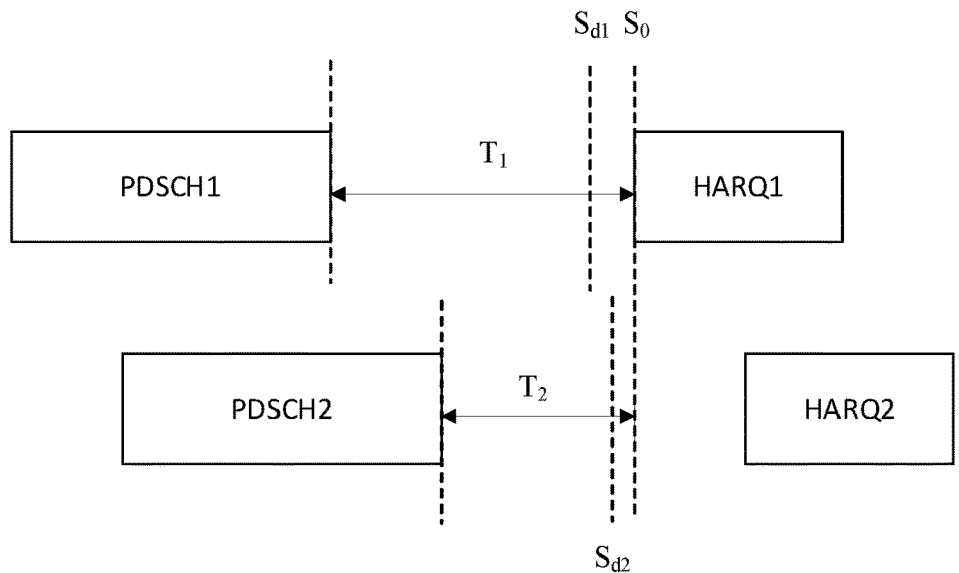
FIG. 3 is a schematic diagram showing a first example of collision between uplink transmissions with different priorities.

FIGS. 3-8 are shows examples of collision between uplink transmissions with different priorities in a time slot. With reference to FIG. 3, PDSCH1 is low priority downlink transmission with corresponding HARQ-ACK feedback HARQ1. PDSCH2 is high priority uplink transmission with corresponding HARQ-ACK feedback HARQ2. The low priority downlink transmission may belong to the eMBB service type. The high priority uplink transmission may belong to the URLLC service type. The HARQ1 and HARQ2 overlap with each other in a time resource unit, such as one slot. If the multiplexing procedure is enabled reusing mechanism in Release16, $S_0$ is the first symbol of HARQ1, and the processing time $T_{proc,1}^{mux}$ is given by the maximum of $\{T_{proc,1}^{mux,PDSCH1}, T_{proc,1}^{mux,PDSCH2}\}$. $T_{proc,1}^{mux,PDSCH1}$ is for the low priority downlink transmission $T_{proc,1}^{mux,PDSCH2}$ is for the high priority downlink transmission PDSCH2. For URLLC traffic, due to the low latency requirements of URLLC traffic, PDSCH2 corresponding to processing capability 2 according to TS 38.214 section 5.3 is frequently performed. PDSCH1 corresponding to processing capability 1 or capability 2 has higher sub-carrier spacing than the PDSCH2. The relation $\mu_{PDSCH1} > \mu_{PDSCH2}$ means higher priority PDSCH has shorter processing time, then $T_{proc,1}^{mux}=T_{proc,1}^{mux,PDSCH1}$ where $\mu_{PDSCH1}$ is sub-carrier spacing of PDSCH1, and $\mu_{PDSCH2}$ is sub-carrier spacing of PDSCH2. However, according to the multiplexing timeline condition in previous releases, such as Release 15 and Release 16, $S_0$ is not before a symbol with CP starting after $T_{proc,1}^{mux}$ after a last symbol of any corresponding PDSCH. The timeline condition requires that the time duration $T_1$ between PDSCH1 and HARQ1 and the time duration $T_2$ between PDSCH2 and HARQ2 to be both larger than $T_{proc,1}^{mux}$. That is, $T_1 > T_{proc,1}^{mux}$, $T_2 > TT_{proc,1}^{mux}$. This timeline condition is too strictive especially for high priority traffic, since $T_2$ has high probability to be less than $T_{proc,1}^{mux}$. However, the multiplexing procedure can be enabled when $T_2 < T_{proc,1}^{mux}$, since time is still sufficient for multiplexing PDSCH1 and PDSCH2 if $T_2 > T_{proc,1}^{mux,PDSCH2}$. When multiplexing procedure is not enable, prioritization mechanism is performed instead to drop the UL transmission with low priority. To minimize the eMBB performance degradation, especially when URLLC traffic is scheduled in a consecutive time, multiplexing timeline condition needs to be enhanced for UL transmissions with different priorities.

In an embodiment of the disclosed method, with reference to FIG. 2, the UE in the multiplexing mode identifies a group of overlapping uplink transmissions in a time resource unit, such as one slot (block 211). The group of overlapping uplink transmissions comprises a first high priority uplink transmission of a high priority service type and a first low priority uplink transmission of a low priority service type. The first high priority uplink transmission may be of any UCI type or may be a PUSCH. The first low priority uplink transmission may be of any UCI type or may be a PUSCH The UE obtains a first multiplexing timeline condition for the high priority service type and a second multiplexing timeline condition for the low priority service type (block 212). The UE determines whether a first high priority uplink transmission satisfies the first multiplexing timeline condition and a first low priority uplink transmission satisfies the second multiplexing timeline condition (block 213).

The first multiplexing timeline condition for the high priority service type comprises a first processing time $T_{proc,1}^{mux,HP}$ which is obtained from a maximum among a plurality of processing time values, such as $\{T_{proc,1}^{mux,HP,1}, T_{proc,1}^{mux,HP,2}\ldots,T_{proc,1}^{mux,HP,i},\ldots\}$, for a plurality of uplink transmissions of the high priority service type in the group of overlapping uplink transmissions in the time resource unit. The first multiplexing timeline condition requires that a first symbol $S_0$ of an high priority earliest uplink transmission among the plurality of uplink transmissions of the high priority service type in the group of overlapping uplink transmissions is not before a delimiting symbol with cyclic prefix (CP) starting after the first processing time after a last symbol of a high priority downlink transmission associated with the high priority earliest uplink transmission. The delimiting symbol, such as $S_{d1}$ in FIG. 3, may be located on a position distant from the last symbol (with CP) of a high priority downlink transmission by a length of the first processing time. The high priority earliest uplink transmission may be a hybrid automatic repeat request (HARQ) feedback signal of the high priority downlink transmission. Alternatively, the high priority earliest uplink transmission may be a PUCCH or a PUSCH scheduled by the high priority downlink transmission.

The second multiplexing timeline condition for the low priority service type comprises a second processing $T_{proc,1}^{mux,LP}$ which is obtained from a maximum among a plurality of processing time values, such as $\{T_{proc,1}^{mux,LP,1}, T_{proc,1}^{mux,LP,2} \ldots, T_{proc,1}^{mux,LP,i} \ldots\}$, for a plurality of uplink transmissions of the low priority service type in the group of overlapping uplink transmissions in the time resource unit. The second multiplexing timeline condition requires that a first symbol $S_0$ of an low priority earliest uplink transmission among the plurality of uplink transmissions of the low priority service type in the group of overlapping uplink transmissions is not before a delimiting symbol with CP starting after the second processing time after a last symbol of a low priority downlink transmission associated with the low priority earliest uplink transmission. The delimiting symbol, such as $S_{d2}$ in FIG. 3, may be located on a position distant from the last symbol (with CP) of a low priority downlink transmission by a length of the second processing time. The low priority earliest uplink transmission may be an HARQ feedback signal of the low priority downlink transmission. Alternatively, the low priority earliest uplink transmission may be a PUCCH or a PUSCH scheduled by the low priority downlink transmission.

The UE performs uplink traffic cancellation to drop uplink traffic with low priority when the first high priority uplink transmission does not satisfy the first multiplexing timeline condition, or when the first low priority uplink transmission does not satisfy the second multiplexing timeline condition (block 214).

The UE performs multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition (block 215).

For example, $S_0$ is the first symbol of the earliest PUCCH or PUSCH. However, $T_{proc}^{mux}$ is calculated for different priority respectively, and the determination as to whether the first and second multiplexing timeline conditions are satisfied should be performed respectively. Specifically, multiplexing timeline conditions are calculated respectively for different priority, $T_{proc,1}^{mux,HP}$ is given by the maximum of $\{T_{proc}^{mux,HP,1}, T_{proc}^{mux,HP,2} \ldots, T_{proc}^{mux,HP,i}, \ldots\}$ and $T_{proc}^{mux,LP}$ is given by the maximum of $\{T_{proc}^{mux,LP,1}, \ldots, T_{proc}^{mux,LP,i}, \ldots\}$. The UE performs for each priority, the determination as to whether the timeline condition of the priority is satisfied by the time duration between an associated downlink transmission and an uplink transmission. For different relationships between the associated downlink transmission and uplink transmission, $T_{proc}^{mux,HP}$ may be used as $T_{proc,2}^{mux,HP}$ or $T_{proc,1}^{mux,HP}$ or other processing time as given by clause 9.2.5 of TS 38.213. For example, $T_{proc,1}^{mux,HP}$ may be a maximum selected from $\{T_{proc,1}^{mux,HP,1}, T_{proc}^{mux} \ldots, T_{proc}^{mux}, \ldots\}$, and $T_{proc,2}^{mux,HP}$ may be a maximum from $\{T_{proc,2}^{mux,HP,1}, T_{proc}^{mux,HP,2} \ldots, T_{proc,1}^{mux,HP,i}, \ldots\}$. $T_{proc,1}^{mux,HP}$ may be a maximum selected from $\{T_{proc,1}^{mux,HP,1}, T_{proc,1}^{mux,LP,2} \ldots, T_{proc,1}^{mux,LP,i}, \ldots\}$, and $T_{proc,1}^{mux,LP}$ may be a maximum from $\{T_{proc}^{mux}, T_{proc}^{mux}, \ldots T_{proc}^{mux}, \ldots\}$.

Similarly, $T_{proc}^{mux,LP}$ may be utilized $T_{proc,2}^{mux,LP}$ or $T_{proc}^{mux}$ or other processing time. The exact function of $T_{proc}^{mux,HP,i}$ or $T_{proc}^{mux,LP,i}$ could be the same as in Release 16 or further release(s).

In the example of FIG. 3, two UL transmissions HARQ1 and HARQ2, and the multiplexing timeline conditions with $T_{proc,1}^{mux}$ for different priorities can be obtained using $T_{proc,1}^{mux,LP}=T_{proc,1}^{mux,PDSCH1}$ and $T_{proc,1}^{mux,HP}=T_{proc,1}^{mux,PDSCH2}$. If $T_1$ and $T_2$ both satisfy the timeline conditions at the same time, the multiplexing procedure is performed. That is, if $T_1>T_{proc,1}^{mux,LP}$ and $T_2>T_{proc,1}^{mux,HP}$, the UE may multiplex HARQ1 and HARQ2. If $T_1$ and $T_2$ do not meet the multiplexing timeline conditions, the UE performs UL cancellation to drop UL transmission with low priority, such as HARQ1.

Embodiments of UCI bit sequence generation are detailed in the following.

The UE generates UCI bit sequence $a_0, a_1, a_2, a_3, \ldots, a_{A-1}$ representing the first high priority uplink transmission of the high priority service type and the first low priority uplink transmission of the low priority service type. The variable $A=O^{ACK}+O^{SR}+O^{CSI}$. If having no HARQ-ACK for transmission on a PUCCH, the UE sets $O^{ACK}=0$. If having no SR for transmission on a PUCCH, the UE sets $O^{SR}=0$. If having no CSI for transmission on a PUCCH, the UE sets $O^{CSI}=0$.

$O^{ACK}$ is a total number of HARQ-ACK information bits, if any. If having no HARQ-ACK for transmission on the PUCCH, the UE sets $O^{ACK}=0$;

$O^{SR}$ is a total number of SR bits. $O_{SR}=0$ if the UE has no scheduling request bit;

$O^{CSI}=\sum_{n=1}^{N_{CSI}^{total}} (O^{CSI-part1,n}+O^{CSI-part2,n})$ where $O^{CSI-part1,n}$ is a number of Part 1 CSI report bits for CSI report with priority value n $O^{CSI-part2,n}$ is a number of Part 2 CSI report bits, if any, for CSI report with priority value n according to TS 38.214, and $N_{CSI}^{total}$ is a number of CSI reports that include overlapping CSI reports.

When the multiplexing procedure for UL transmissions with different priorities is enabled, the UE rearranges the UCI bit sequence. UCI bits for a UCI type with higher priority are transmitted first. Bits in the UCI bit sequence representing the first high priority uplink transmission of the high priority service type are placed before bits in the UCI bit sequence representing the first low priority uplink transmission of the low priority service type irrespective of a UCI type of the first high priority uplink transmission and a UCI type of the first low priority uplink transmission. For example, all the UCI types with high priority should be prioritized, which means the first $A_{HP}$ bits of the UCI bit sequence are high priority, where $A=A_{HP}+A_{LP}$. HP means high priority, LP means low priority. For example, if there are HARQ-ACK, SR and CSI transmission on PUCCH, the UCI bit sequence may be $a_0, a_1, \ldots, a_{A_{HP}-1}, a_{A_{HP}}, \ldots, a_{A-1}$, where $A_{HP}=O^{ACK,HP}+O^{SR,HP}+O^{CSI,HP}$ and $A_{LP}=O^{ACK,LP}+O^{SR,LP}+O^{CSI,LP}$.

UCI bits for a UCI type with higher priority are transmitted first. Bits in the UCI bit sequence representing the first high priority uplink transmission of the high priority service type are placed before bits in the UCI bit sequence representing the first low priority uplink transmission of the low priority service type with respects to a UCI type of the first high priority uplink transmission and a UCI type of the first low priority uplink transmission. For example, for each UCI type, UL transmission with high priority comes first, where $A=A_{HP}+A_{LP}$. For example, if there are HARQ-ACK, SR and CSI transmission on PUCCH, the total number of UCI bits may also be calculated as $A=O^{ACK,HP}+O^{ACK,LP}+$ $O^{SR,HP}+O^{SR,LP}+O^{CSI,HP}+O^{CSI,LP}$, where $A_{HP}=O^{ACK,HP}+O^{SR,HP}+O^{CSI,HP}$ and $A_{LP}$ $O^{ACK,LP}+O^{SR,LP}+O^{CSI,LP}$.

Take HARQ-ACK as an example, a UE determines $\tilde{o}_0^{ACK}, \tilde{o}_1^{ACK}, \ldots, \tilde{o}^{ACK} o^{ACK}_{-1}$ HARQ-ACK information bits, for a total number of $O^{ACK}$ HARQ-ACK information bits, where $O^{ACK}=O^{ACK,HP}+O^{ACK,LP}$. The HARQ-ACK bits are mapped to the UCI bit sequence $a_0, a_1, a_2, a_3, \ldots, a_{o^{ACK}-1}$, where $a_i=\tilde{o}_i^{ACK,HP}$ for i=0,1, . . . ,1, and $a_i=\tilde{o}_i^{ACK,LP}$ for $i=O^{ACK,HP}, O^{ACK,HP}+1, \ldots, O^{ACK}-1$, the HARQ-ACK bit sequence $\tilde{o}_0^{ACK}, \tilde{o}_1^{ACK}, \ldots, \tilde{o}^{ACK} o^{ACK}_{-1}$ is given by Clause 9.1 of TS 38.213, and $O^{ACK}$ is total number of HARQ-ACK bits; if the UE has no HARQ-ACK for transmission on the PUCCH, set $O^{ACK}=0$. For SR and CSI transmission, the arranging order is the same.

When having more than one high priority UL transmission or more than one low priority UL transmission to be multiplexed, the UE always places high priority before the low priority. When having two UL transmissions with same priorities, the UE has UL transmission with earlier first symbol placed before the UL transmission with later first symbol. For two UL transmissions with same first symbol and same priority, the placement is arbitrary.

The BS receives the UCI bit sequence from the UE. If the number of UCI bits is insufficient for of the UCI types, UCI bits of high priority UL transmission is prioritized in the UCI bit sequence.

Embodiments regarding collision handling between more than two2 channels are detailed in the following.

One of the key features of URLLC is the low latency. Hence, multiplexing cannot have any bad influence to the latency of URLLC traffic, which means, the end of PUCCH or PUSCH after the multiplexing cannot be later than the end of PUCCH or PUSCH for URLLC. In the following, the UE enables the multiplexing procedure for UL transmissions with different priorities to ensure that the multiplexed UL transmission is no later than UL transmission of URLLC. When determining that the multiplexed UL transmission may be later than UL transmission of URLLC, the UE does not enable the multiplexing procedure for UL transmissions with different priorities, and performs UL prioritization and cancellation.

In Release16, to resolve collision between UL transmissions, a UE performs the following:
 Step 1: Resolve collision between UL transmissions with same priority; and
 Step 2: Resolve collision between UL transmissions with different priorities.

Figure 4:
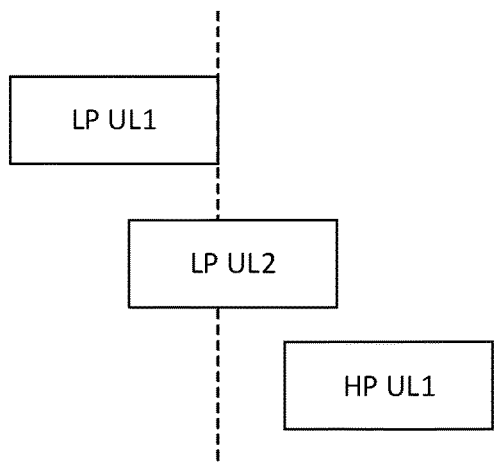
FIG. 4 is a schematic diagram showing a second example of collision between uplink transmissions with different priorities.

This agreed procedure cannot apply to all collision cases during multiplexing for UL transmissions with different priorities is enabled, and may lead to UL dropping. As shown in FIG. 4, a first low priority UL transmission (LP UL1) overlaps with a second low priority UL transmission (LP UL2) in a time slot, and the LP UL2 collides with a first high priority UL transmission (HP UL1). According to the agreed procedure in Release 16, a UE resolves the collision between low priority in the first step. When the two low priority UL transmissions do not meet the multiplexing timeline condition, the LP UL2 is dropped. However, if LP UL2 can be multiplexed with HP UL1, the three UL transmissions are all transmitted without dropping. Therefore, this agreement has negative influence to the performance of low priority UL transmissions. If multiplexing procedure is performed, both the latency of high priority UL transmission and reliability of low priority UL transmission can both be guaranteed.

The multiplexing procedure for more than two collided UL transmissions is detailed in the following. The UE performs multiplexing procedure if the timeline conditions are satisfied. The group of overlapping uplink transmissions in the time resource unit further comprises a second low priority uplink transmission, such as LP UL2 in FIG. 5, of the low priority service type. The UE may drop one of the first low priority uplink transmission and the second low priority uplink transmission based on UCI types of the first and second low priority uplink transmission when multiplexing of both of the first and second low priority uplink transmission with the first high priority uplink transmission is not allowed.

Figure 6:
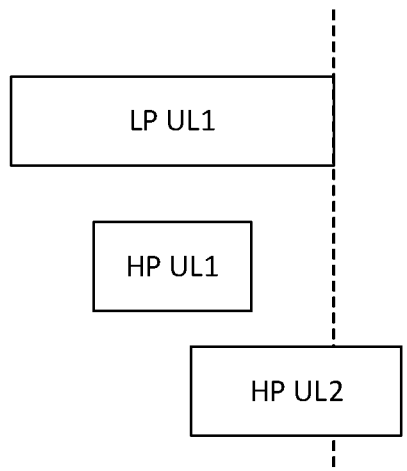
FIG. 6 is a schematic diagram showing a fourth example of collision between uplink transmissions with different priorities.

The group of overlapping uplink transmissions in the time resource unit further comprises a second high priority uplink transmission of the high priority service type, such as HP UL2 in FIG. 6. The UE may drop the first low priority uplink transmission based on comparison between the low priority service type and the high priority service type when multiplexing of both of the first and second high priority uplink transmission with the first low priority uplink transmission is not allowed.

Figure 5:
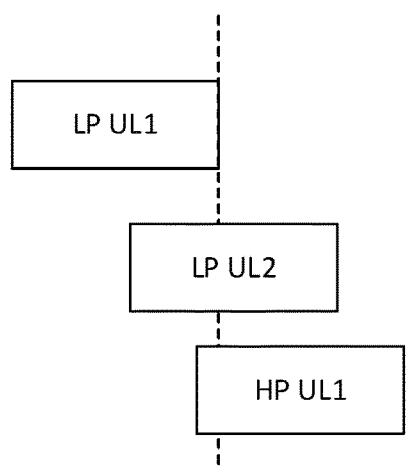
FIG. 5 is a schematic diagram showing a third example of collision between uplink transmissions with different priorities.

For example, in FIGS. 5 and 6, three UL transmissions overlap with each other. If the three UL transmissions satisfy the timeline conditions, the UE multiplexes the three UL transmissions together. However, if the UCI sequences do not have enough space for multiplexing all the UL transmissions, the UE first prioritizes and multiplexes UL transmission with higher priority. As shown in FIG. 5, if the multiplexing has limitation, the UE has only one of the UL transmissions with low priority be multiplexed with high priority UL transmission. The UE may choose one of the UL transmissions with low priority arbitrarily or based on the UCI types. As shown in FIG. 6, when the three UL transmissions all satisfied the multiplexing timeline conditions, and the multiplexing has limitation that only two of the UL transmissions can be multiplexed, then the UE drops LP UL1 and multiplexes HP UL1 and HP UL2.

Figure 7:
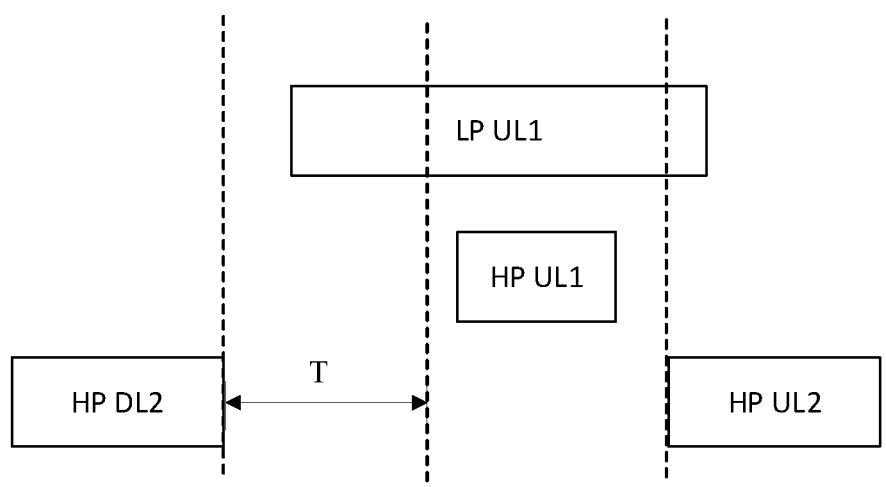
FIG. 7 is a schematic diagram showing a fifth example of collision between uplink transmissions with different priorities.

From the perspective of UL transmission with lower priority, postponing the UL transmission with low priority for the available UL transmission in the future may miss proper cancellation time. Hence, a new limitation is set for the multiplexing procedure. As shown in FIG. 7, a first low priority UL transmission (LP UL1) overlaps with a first high priority UL transmission (HP UL1) and a second high priority UL transmission (HP UL2) respectively. In a situation, the BS use a second high priority DL transmission (HP DL2) to schedule HP UL2. In another situation, the HP UL2 is a response, such as HARQ feedback, which responds to the HP DL2. If the LP UL1 and the HP UL2 meet the multiplexing timeline conditions, the UE may multiplex the LP UL1 with the HP UL2 to solve the collision. However, before the HP DL2 is detected, the UE doesn't know a later HP UL2 after the LP UL1 is available for multiplexing. Between LP UL1 and HP UL1 only prioritization can be performed since the multiplexed channel must be later than the end of HP UL 1. If the UE performs prioritization between LP UL1 and HP UL1, LP UL1 needs to be dropped and a cancellation point is shown in FIG. 7.

The UE determines a cancelation point in time based on the first high priority uplink transmission, such as HP UL1, and the first low priority uplink transmission, such as LP UL1. The cancelation point specifies a position in time to drop at least one portion of the first low priority uplink transmission (LP UL1) overlapping with the first high priority uplink transmission (HP UL1) when the multiplexing is not enabled.

The UE postpones the first low priority uplink transmission (LP UL1) to be multiplexed with a subsequent high priority uplink transmission (HP UL2) when successfully receiving a high priority downlink transmission (HP DL2) comprising downlink control information for scheduling the subsequent high priority uplink transmission (HP UL2) before the cancelation point by a threshold range of time (MuxTh).

In the example, the UE multiplexes LP UL1 and HP UL2 only when HP DL2 is no later than cancellation point, and T>1. T may be measured in units of symbols. Further, a new threshold parameter may be identified as MuxTh, which may be determined by DCI or a higher layer parameter, such an RRC information element (IE). If the end of high priority downlink transmission HP DL2 scheduling the HP UP2 is located MuxTh symbols before the cancellation point, the UE may postpone the first low priority UL transmission LP UL1 for multiplexing with HP UL2 and rather than dropping the LP UL1. As shown in FIG. 7, if T≥MuxTh, LP UL1 and HP UL2 may be multiplexed by the UE.

Further analysis and solutions to specific scenarios are given in the following.

The embodiments detailed above are applicable to all UCI types or PUSCH. However, for some specific UCI types, collision handling requires specific procedures.

In a scenario where UL collision involves eMBB HARQ vs. URLLC HARQ, an embodiment of the disclosed method is detailed in the following.

NR Release 16 supports sub-slot based HARQ-ACK feedback and supports up to two HARQ-ACK codebooks with different priorities to be simultaneously constructed. If multiplexing is performed between eMBB HARQ-ACK and URLLC HARQ-ACK, a solution to process eMBB and URLLC traffics with different time granularity is desired to minimize eMBB performance degradation. If no collision occurs between UL resources for eMBB HARQ-ACK and URLLC HARQ-ACK, the UE transmits both the eMBB HARQ-ACK in an eMBB PUCCH and the URLLC HARQ-ACK in a URLLC PUCCH separately.

In multiplexing of the eMBB HARQ feedback and the URLLC HARQ feedback, the UE places sub-slot-based HARQ-ACK feedback before slot-based HARQ-ACK feedback. In this situation, at least one portion of HARQ-ACK feedback in PUCCH or PUSCH is sub-slot based, which means the time granularity of the PUCCH or PUSCH is sub-slot based. The UE may set remaining bits in PUCCH after multiplexing to zero. The BS receives the HARQ-ACK feedback from the UE.

In a scenario where UL collision involves HARQ vs. PUSCH, an embodiment of the disclosed method is detailed in the following.

Figure 8:
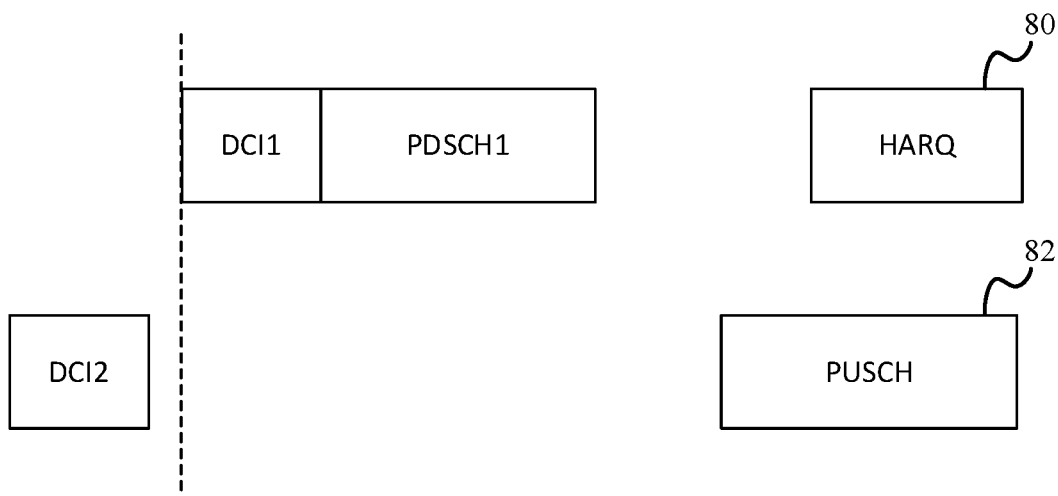
FIG. 8 is a schematic diagram showing a sixth example of collision between uplink transmissions with different priorities.

In Release 15, a UE does not expect to detect a DCI format scheduling a PDSCH reception or a SPS PDSCH release and indicating a resource for a PUCCH transmission with corresponding HARQ-ACK information in a slot if the UE previously detects a DCI format scheduling a PUSCH transmission in the slot and if the UE multiplexes HARQ-ACK information in the PUSCH transmission. The restriction may introduce additional latency and degradation reliability for URLLC or eMBB and may be removed in Release 17. For example, as shown in FIG. 8, DCI1 provides scheduling information for PDSCH1 of URLLC service type, and the HARQ-ACK feedback 80 is in response to PDSCH1. An earlier DCI2 provides scheduling information for PUSCH 82 of eMBB service type. If the restriction in release 15 is reused, the overlapping HARQ 80 and PUSCH 82 cannot be multiplexed. URLLC traffic has higher priority over eMBB traffic, so that PUSCH of eMBB traffic is dropped in collision with URLLC HARQ-ACK feedback 80. Frequent dropping procedure has significant negative influence to the eMBB service performance. If the timeline conditions are satisfied for multiplexing, the multiplexing procedure is performed to guarantee both the performance of URLLC and eMBB. Additionally, the BS may indicate a beta offset to the UE to determine a number of radio resources for multiplexing HARQ-ACK 80 in the PUSCH 82. Similarly, in another example where DCI1 is of eMBB service type and DCI2 is of URLLC service type, the embodiment is also applicable. Any combinations of the embodiments above is possible.

Figure 9:
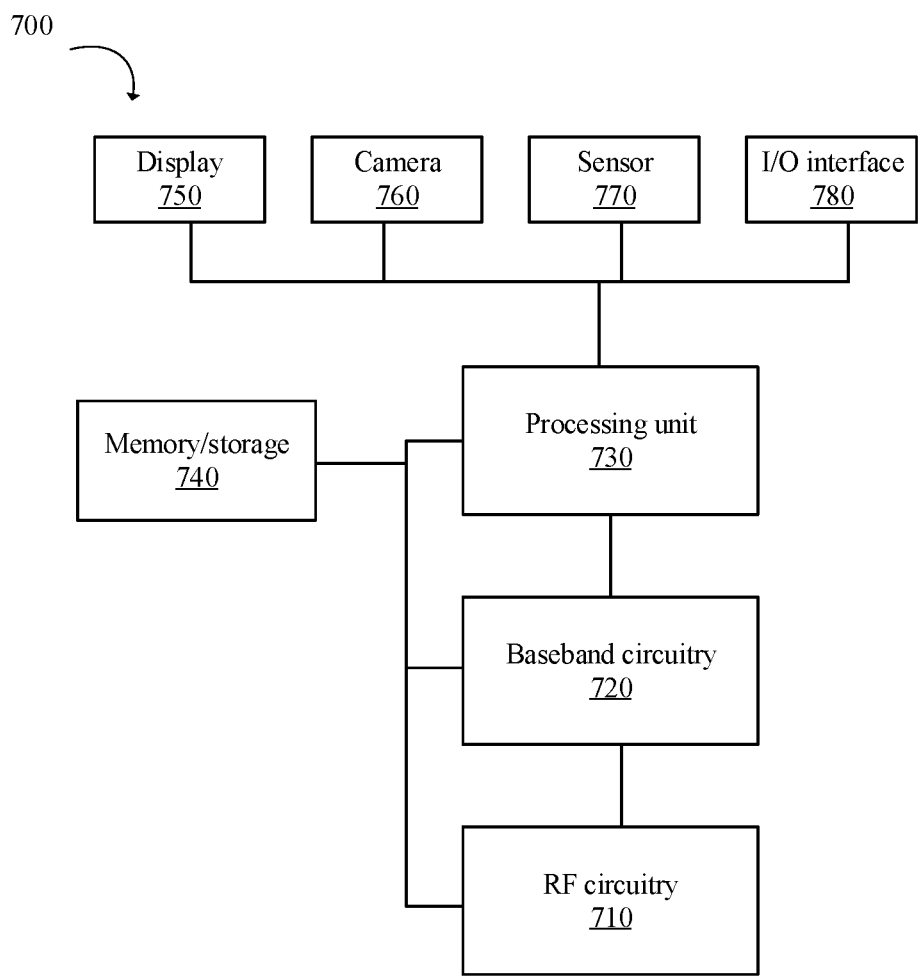
FIG. 9 is a block diagram of a system for wireless communication according to an embodiment of the present disclosure.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

The embodiment of the present disclosure is a combination of techniques/processes that can be adopted in 3 GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

This invention provides methods relevant to the intra-UE multiplexing for traffic with different priorities. Current intra-UE multiplexing in a UE only supports prioritization of high priority traffic to drop low priority signals and channels. Intra-UE multiplexing of UL signals/channels with different priorities can improve the system efficiency.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. An intra-user equipment (UE) multiplexing method executable in a UE, comprising:
    identifying a group of overlapping uplink transmissions in a time resource unit, wherein the group of overlapping uplink transmissions comprises a first high priority uplink transmission of a high priority service type and a first low priority uplink transmission of a low priority service type;

obtaining a first multiplexing timeline condition for the high priority service type and a second multiplexing timeline condition for the low priority service type; and performing multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition, wherein the multiplexing is enabled in response to a downlink control information (DCI) signal or a radio resource control (RRC) signal;

wherein the first high priority uplink transmission of the high priority service type has $A_{HP}=O^{ACK,HP}+O^{SR,HP}+C^{SI,HP}$ uplink control information (UCI) bits, where $O^{ACK,HP}$, $O^{SR,HP}$ and $O^{CSI,HP}$ is a total number of hybrid automatic repeat request acknowledgment (HARQ-ACK) information bits, scheduling request (SR) bits and channel state information (CSI) bits of high priority respectively;

the first low priority uplink transmission of the low priority service type has $A_{LP}=O^{ACK,LP}+O^{SR,LP}+O^{CSI,LP}$ UCI bits, where $O^{ACK,LP}$, $O^{SR,LP}$ and $O^{CSI,LP}$ is a total number of HARQ-ACK information bits, SR bits and CSI bits of low priority respectively;

a total UCI bits number is a sum of the UCI bits of first high priority uplink transmission and the UCI bits of first low priority uplink transmission; and physical uplink control channel (PUCCH) resources used for multiplexing is based on the total UCI bits number.

2. The method of claim 1, wherein the time resource unit is one slot.

3. The method of claim 1, wherein the first multiplexing timeline condition for the high priority service type comprises a first processing time which is obtained from a maximum among a plurality of processing time values for a plurality of uplink transmissions of the high priority service type in the group of overlapping uplink transmissions in the time resource unit.

4. The method of claim 3, wherein the first multiplexing timeline condition requires that a first symbol of an high priority earliest uplink transmission among the plurality of uplink transmissions of the high priority service type in the group of overlapping uplink transmissions is not before a symbol with cyclic prefix (CP) starting after the first processing time after a last symbol of a high priority downlink transmission associated with the high priority earliest uplink transmission.

5. The method of claim 4, wherein the high priority earliest uplink transmission is a hybrid automatic repeat request (HARQ) feedback signal of the high priority downlink transmission.

6. The method of claim 4, wherein the high priority earliest uplink transmission is a physical uplink shared channel (PUSCH) scheduled by the high priority downlink transmission.

7. The method of claim 1, wherein the second multiplexing timeline condition for the low priority service type comprises a second processing time which is obtained from a maximum among a plurality of processing time values for a plurality of uplink transmissions of the low priority service type in the group of overlapping uplink transmissions in the time resource unit.

8. The method of claim 7, wherein the second multiplexing timeline condition requires that a first symbol of an low priority earliest uplink transmission among the plurality of uplink transmissions of the low priority service type in the group of overlapping uplink transmissions is not before a symbol with cyclic prefix (CP) starting after the second processing time after a last symbol of a low priority downlink transmission associated with the low priority earliest uplink transmission.

9. The method of claim 1, further comprising:
transmitting an uplink control information (UCI) bit sequence representing the first high priority uplink transmission of the high priority service type and the first low priority uplink transmission of the low priority service type, wherein bits in the UCI bit sequence representing the first high priority uplink transmission of the high priority service type are placed before bits in the UCI bit sequence representing the first low priority uplink transmission of the low priority service type with respect to a UCI type of the first high priority uplink transmission and a UCI type of the first low priority uplink transmission.

10. The method of claim 1, further comprising:
transmitting an uplink control information (UCI) bit sequence representing the first high priority uplink transmission of the high priority service type and the first low priority uplink transmission of the low priority service type, wherein bits in the UCI bit sequence representing the first high priority uplink transmission of the high priority service type are placed before bits in the UCI bit sequence representing the first low priority uplink transmission of the low priority service type irrespective of a UCI type of the first high priority uplink transmission and a UCI type of the first low priority uplink transmission.

11. The method of claim 1, further comprising:
transmitting an uplink control information (UCI) bit sequence representing the first high priority uplink transmission of the high priority service type and the first low priority uplink transmission of the low priority service type, wherein bits in the UCI bit sequence representing HARQ feedback of sub-slot- based downlink transmission are placed before bits in the UCI bit sequence representing HARQ feedback of slot-based downlink transmission.

12. The method of claim 1, further comprising:
determining a cancelation point in time based on the first high priority uplink transmission and the first low priority uplink transmission, wherein the cancelation point specifies a position in time to drop at least one portion of the first low priority uplink transmission overlapping with the first high priority uplink transmission when the multiplexing is not enabled; and postponing the first low priority uplink transmission to be multiplexed with a subsequent high priority uplink transmission when successfully receiving a high priority downlink transmission comprising downlink control information for scheduling the subsequent high priority uplink transmission before the cancelation point by a threshold range of time.

13. The method of claim 1, wherein the group of overlapping uplink transmissions in the time resource unit further comprises a second low priority uplink transmission of the low priority service type, the method further comprises:
dropping one of the first low priority uplink transmission and the second low priority uplink transmission based on UCI types of the first and second low priority uplink transmission when multiplexing of both of the first and second low priority uplink transmission with the first high priority uplink transmission is not allowed.

14. The method of claim 1, wherein the group of overlapping uplink transmissions in the time resource unit further comprises a second high priority uplink transmission of the high priority service type, the method further comprises:
dropping the first low priority uplink transmission based on comparison between the low priority service type and the high priority service type when multiplexing of both of the first and second high priority uplink transmission with the first low priority uplink transmission is not allowed.

15. The method of claim 1, further comprising:
if a multiplexing condition is satisfied for multiplexing UL transmissions with different priorities, a multiplexing procedure is performed for HARQ-ACK transmission with high priority and PUSCH with low priority, a beta offset is indicated to the UE to determine a number of radio resources for multiplexing HARQ-ACK in PUSCH.

16. The method of claim 1, further comprising:
if a multiplexing condition is satisfied for multiplexing UL transmissions with different priorities, a multiplexing procedure is performed for HARQ-ACK transmission with low priority and PUSCH with high priority, a beta offset is indicated to the UE to determine a number of radio resources for multiplexing HARQ-ACK in the PUSCH.

17. The method of claim 1, wherein the multiplexing is enabled in response to a condition that dropping of low priority uplink transmissions contributes to a predetermined ratio of all low priority uplink transmissions during a period of time.

18. A user equipment comprising:
a transceiver; and
a processor connected with the transceiver and configured to execute the following steps comprising:
identifying a group of overlapping uplink transmissions in a time resource unit, wherein the group of overlapping uplink transmissions comprises a first high priority uplink transmission of a high priority service type and a first low priority uplink transmission of a low priority service type; obtaining a first multiplexing timeline condition for the high priority service type and a second multiplexing timeline condition for the low priority service type; and
performing multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition, wherein the multiplexing is enabled in response to a downlink control information (DCI) signal or a radio resource control (RRC) signal;
wherein the first high priority uplink transmission of the high priority service type has $A_{HP}=O^{ACK,HP}+O^{SR,HP}+O^{CSI,HP}$ uplink control information (UCI) bits, where $O^{ACK,HP}$, $O^{SR,HP}$ and $O^{CSI,HP}$ a total number of hybrid automatic repeat request acknowledgment (HARQ-ACK) information bits, scheduling request (SR) bits and channel state information (CSI) bits of high priority respectively;
the first low priority uplink transmission of the low priority service type $A_{LP}=O^{ACK,LP}+O^{SR,LP}+O^{CSI,LP}$ UCI bits, where $O^{ACK,LP}$, $O^{SR,LP}$ and $O^{CSI,LP}$ is a total number of HARQ-ACK information bits, SR bits and CSI bits of low priority respectively;
a total UCI bits number is a sum of the UCI bits of first high priority uplink transmission and the UCI bits of first low priority uplink transmission; and
physical uplink control channel (PUCCH) resources used for multiplexing is based on the total UCI bits number.

19. The user equipment of claim 18, wherein the time resource unit is one slot.

20. A radio node device comprising:
a transceiver; and
a processor connected with the transceiver and configured to execute the following steps comprising:
transmitting a control signal to enable a multiplexing mode for multiplexing of a group of overlapping uplink transmissions in a time resource unit at a UE, wherein the control signal comprises a downlink control information (DCI) signal or a radio resource control (RRC) signal;
allowing the UE in the multiplexing mode to obtain a first multiplexing timeline condition for a high priority service type and a second multiplexing timeline condition for a low priority service type when the group of overlapping uplink transmissions comprises a first high priority uplink transmission of the high priority service type and a first low priority uplink transmission of the low priority service type; and
allowing the UE in the multiplexing mode to perform multiplexing of the first high priority uplink transmission and the first low priority uplink transmission in the time resource unit when the first high priority uplink transmission satisfies the first multiplexing timeline condition and the first low priority uplink transmission satisfies the second multiplexing timeline condition;
wherein the first high priority uplink transmission of the high priority service type has $A_{HP}=O^{ACK,HP}+O^{SR,HP}+O^{CSI,HP}$ uplink control information (UCI) bits, where $O^{ACK,HP}$, $O^{SR,HP}$ and $O^{CSI,HP}$ is a total number of hybrid automatic repeat request acknowledgment (HARQ-ACK) information bits, scheduling request (SR) bits and channel state information (CSI) bits of high priority respectively;
the first low priority uplink transmission of the low priority service type has $A_{LP}=O^{ACK,LP}+O^{SR,LP}+O^{CSI,LP}$ UCI bits, where $O^{ACK,LP}$, $O^{SR,LP}$ and $O^{CSI,LP}$ is a total number of HARQ-ACK information bits, SR bits and CSI bits of low priority respectively;
a total UCI bits number is a sum of the UCI bits of first high priority uplink transmission and the UCI bits of first low priority uplink transmission; and
physical uplink control channel (PUCCH) resources used for multiplexing is based on the total UCI bits number.

* * * * *